March 23, 1937.  G. WÜNSCH  2,074,882
PROPORTIONING CONTROL APPARATUS AND METHOD
OF CONTROLLING THE OPERATION THEREOF
Filed Oct. 30, 1934
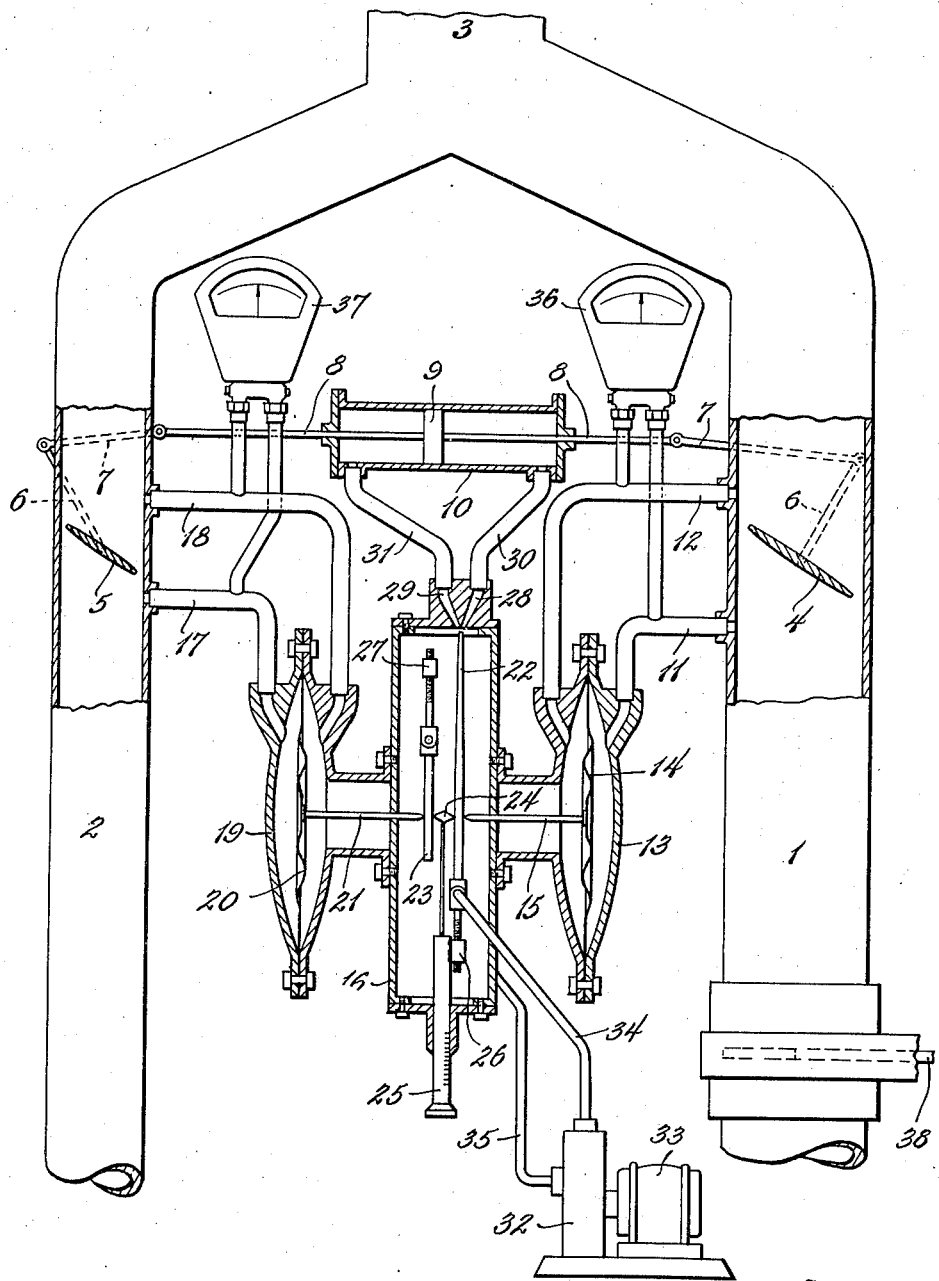
Inventor
Guido Wunsch
By A. D. Adams
Attorney Patented Mar. 23, 1937

2,074,882

UNITED STATES PATENT OFFICE 2,074,882

PROPORTIONING CONTROL APPARATUS AND METHOD OF CONTROLLING THE OPERATION THEREOF

Guido Wünsch, Berlin-Steglitz, Germany, assignor to Askania-Werke A. G. vormals Central Werkstatt Dessau und Carl Bamberg-Friedenau, a corporation of Germany Application October 30, 1934, Serial No. 750,700
In Germany November 30, 1933

4 Claims. (Cl. 137—164)

This invention relates to proportioning control apparatus of the general type shown in U. S. Patent No. 1,558,529, dated October 27, 1925 and, among other objects, aims to provide an improved method and means for controlling the mixture of two media, such as gases, liquids or other fluent materials by balancing two impulses representing the respective flows created by differential pressures within the two media, using variable restrictions the free areas of which are increased or decreased simultaneously. The invention will be explained in connection with a gas proportioning device or regulator such as is commonly used for controlling the mixture of air and gas or separate gases supplied to a furnace. However, the invention is not to be considered as being restricted in any sense to this specific application or to the particular embodiment thereof shown in the accompanying drawing.

Other aims and advantages of the invention will appear in the specification, when considered in connection with the accompanying drawing, wherein:

The figure is an elevation, partly in section, showing the preferred form of apparatus for practicing the method.

The aforesaid patent relates to a regulator or ratio control mechanism wherein the mixture of two gases is governed by differential pressures created on opposite sides of fixed orifice plates arranged in the gas conduits. The mechanism utilizes a well known jet pipe system to effect the regulation by balancing the differential pressures against each other. Such a system is satisfactory only when the flow ranges of the gases are comparatively small. It will not operate satisfactorily when there are wide variations in differential pressure resulting from increased or decreased flow of the gases. The differential pressure created on opposite sides of the fixed orifice plates varies with the second power of flow and, as the differential pressure increases or decreases, the sensitivity of the control mechanism is decreased. To make such a system operate satisfactorily for wide variations in flow, it is important that the variations in the differential pressures shall be relatively small. In other words, the free areas of the orifices should be changed as the flow increases or decreases so as to modify the pressure differential only slightly and keep within the range of the proportional control mechanism. Incidentally, there is a maximum and a minimum pressure at which a diaphragm control mechanism will operate satisfactorily and this applies to more or less sensitive mechanisms of other types. This invention therefore aims to provide such a system or mechanism which operates satisfactorily to control the ratio of gases or other media for a relatively wide degree of changes in flow.

Referring particularly to the drawing, it will be assumed that the system shown is applied to the regulation of two gases. The primary gas flows through a conduit 1 and the secondary gas through a conduit 2. These gases mix and are delivered to a common conduit 3 or to a chamber, as the case may be. Instead of employing fixed orifice plates in the conduits, butterfly valves 4 and 5 are used to vary the free areas of the respective conduits in response to changes or variations in flow. Each of these butterfly valves is shown as having a crank arm 6 connected by a pivoted link 7 to a piston rod 8 carrying a piston 9 in a cylinder 10, the arrangement being such that the butterfly valves move simultaneously. To utilize a differential pressure on opposite sides of the butterfly valve 4 in the conduit 1, pipes 11 and 12 are connected to said conduit on opposite sides of the valve and lead to a diaphragm casing 13 on opposite sides of a diaphragm 14 which carries a push-pin or stem 15 extending through an opening in one side of a regulator casing 16. Likewise, pipes or conduits 17 and 18 are connected to the secondary gas conduit 2 and lead to a diaphragm casing 19 on opposite sides of a diaphragm 20 which carries a push-pin or stem 21 extending through the opposite side or wall of the regulator casing 16, the arrangement being such that the two push-pins or stems 15 and 21 act in opposition to each other.

The push-pin 15 carried by the diaphragm 14 is shown as acting directly on a pivoted jet nozzle 22; while the push-pin 21 acts on a pivoted counter-lever 23. Between the counter-lever 23 and the nozzle 22 there is arranged a ratio adjusting disk 24 carried on a ratio slider 25 which projects through the regulator casing. The arrangement is such that the ratio can be varied by moving the ratio slider in or out. However, this particular mechanism forms no part of the present invention. The jet nozzle 22 is shown as being counterbalanced by an adjustable weight 26 screwed on a stem projecting beyond its pivot. Also, the counter-lever 23 is preferably counterweighted by a similar adjustable weight 27. The adjustable slider 25 does not interfere with the swinging movement of the nozzle.

It will be seen that the differential pressures on the diaphragms act against each other and against the jet pipe. When the differential pressures balance each other, the jet pipe is in the neutral position shown. It is adapted to be moved either to the right or to the left when the pressures are unbalanced. The jet pipe cooperates with two orifices or openings 28 and 29 which are connected by pipes 30 and 31 to opposite ends of the cylinder 10. Now, if the differential pressure is unbalanced, the jet pipe will move so as to discharge directly into one of the orifices and thereby actuate the piston 9 to change the positions of the two butterflies. Assuming that the differential pressure is increased in the primary gas conduit, the jet pipe will be moved to the left and thereby discharge into the left hand end of the cylinder to move the piston 9 to the right. This will open both butterflies further until equilibrium is again established or the pressures balance each other. The jet pipe is preferably supplied with oil or other liquid by a pump 32 which is operated by a motor 33. The pump is connected to the jet pipe by a pipe 34 and the liquid is circulated through the pump by means of a return pipe 35 connected to the bottom portion of the regulator casing.

The quantity of gases flowing through the respective conduits may be measured by suitable flow meters 36 and 37 connected to the differential pressure pipes. Moreover, the quantity of primary gas may be varied by a suitable valve 38 in the conduit 1.

From the foregoing description, it will be seen that the free areas of the openings or restrictions formed by the butterflies are varied when their positions are changed and it is easy to calculate their areas so as to obtain differential pressures for different flows within the range of the instrument. The butterflies are mechanically connected because it is desirable in both cases to have a decrease in differential pressures for an increase in flow and an increase in differential pressure for a decrease in flow. The most important point to be considered in this calculation is the dimension of the butterfly valve 4. It is such that in spite of its movement, the flow of gas is only slightly affected. This is done by making the diameter of the primary gas line relatively large as shown and by limiting the stroke of the valve 4. Such a combination serves to create a relatively small differential pressure, while the butterfly in the gas line 2 regulates the flow of secondary gas. The movement of the butterfly valve 5 in the line 2 affects materially the flow of secondary gas since the conduit 2 is smaller. Thus, the regulation of the mixture or ratio is controlled accurately because the pressure differentials in the primary gas conduit are kept well within the range of the instrument. The amount of the secondary gas is determined by the opening of the valve 38 and, at the same time, the impulse obtained from the movement or flow of the primary gas is affected by the controlling valve in such a manner that for an increase in flow of the secondary gas or medium the impulse of the primary gas or medium is decreased, and vice versa.

Obviously, the present invention is not restricted to the particular embodiment thereof herein shown and described. Moreover, it is not indispensable that all the features of the invention be used conjointly, since they may be employed advantageously in various combinations and subcombinations.

What is claimed is:

1. In apparatus for regulating and controlling the flow of separate media passing through conduits, movable restricting means in each of the conduits; means connecting said restricting means to operate simultaneously; and a regulator operable by differential pressures in either of the conduits connected to control the movements of said restricting means.

2. In ratio control apparatus for separate fluid media to be mixed, a pair of conduits for the media; mechanically connected and simultaneously movable restricting devices in the conduits; actuating means associated with the mechanical connections to impart controlling movements to said restricting devices; and a regulator operable by differential pressures in either of the conduits connected to govern the operation of said actuating means.

3. In ratio control apparatus for separate fluid media to be mixed, a pair of conduits for the media; mechanically connected and simultaneously movable butterfly valves in the conduits; a regulator operated by the pressure differences at said valves; and means governed by said regulator to actuate said valves.

4. That method of proportioning the flow of primary and secondary fluid media passing through conduits, which is characterised by restricting the flow in the conduits to create differential pressures; using the differential pressures created in either of the conduits to operate a regulator; and simultaneously varying the restrictions by the governing action of the regulator whereby to reduce the range of pressure differences.

GUIDO WÜNSCH.